United States Patent [19]

Lytle et al.

[11] Patent Number: 5,453,912
[45] Date of Patent: Sep. 26, 1995

[54] RADIO ASSEMBLY AND RADIO DISASSEMBLY TOOL

[75] Inventors: J. Michael Lytle, Chicago; Martin E. Holmes, Hoffman Estates; Mark F. Witczak, Palatine, all of Ill.; Peter D. Iezzi, Coral Springs, Fla.; William M. Bradford, Hoffman Estates, Ill.

[73] Assignee: Motorola, Inc., Schaumburg, Ill.

[21] Appl. No.: 202,141

[22] Filed: Feb. 25, 1994

[51] Int. Cl.⁶ ..................................... H04B 1/03
[52] U.S. Cl. .................. 361/814; 361/796; 361/825; 174/17 R; 312/7.1
[58] Field of Search .................. 361/752, 796, 361/801, 802, 814, 825; 312/7.1; 248/245, 27.1, 553; 455/127, 346, 348; 174/17 R

[56] References Cited

U.S. PATENT DOCUMENTS

| | | | |
|---|---|---|---|
| 4,578,739 | 3/1986 | McKee et al. | 361/395 |
| 4,815,980 | 3/1989 | Lauder et al. | |
| 4,957,264 | 9/1990 | Hakanen | 248/510 |
| 5,193,890 | 3/1993 | Robertson, Jr. et al. | 312/7.1 |
| 5,203,022 | 4/1993 | Finch et al. | 455/127 |

Primary Examiner—Leo P. Picard
Assistant Examiner—Young Whang
Attorney, Agent, or Firm—Andrew S. Fuller

[57] ABSTRACT

A radio assembly (100) includes a radio chassis (120) and radio housing (150). The radio chassis (120) includes a resilient cantilever arm (130) having an engaging portion (135). The radio housing (150) includes a mount channel (156) to position the cantilever arm (130), and a ramped catch portion (157) within the mount channel (156) to engage the engaging portion (135) of the cantilever arm (130) and to secure the radio chassis (120) within the radio housing (150). The chassis (120) is mounted to the radio housing (150) such that the engaging portion (135) of the cantilever arm (130) is positioned within the mount channel (156). The engaging portion (135) of the cantilever arm (130) is biasedly engaged with the ramped catch portion (157), and is deflectable so as to disengage from the ramped catch portion (157) when a deflecting force is applied to the engaging portion (135). A radio disassembly tool (300) disassembles the radio assembly (100) by deflecting and releasing the engaging portion (135) of the cantilever arm (130) from the ramped catch portion (157).

18 Claims, 5 Drawing Sheets

RADIO ASSEMBLY AND RADIO DISASSEMBLY TOOL

TECHNICAL FIELD

This invention relates in general to radio assemblies, and more particular, to radio assemblies formed for ease of assembly and disassembly.

BACKGROUND

Portable electronic devices, such as two-way radio transceivers, typically include a frame or chassis to which internal electrical and mechanical components are mounted. The chassis is typically enclosed in a housing to protect the integrity of these internal components. An important factor in the manufacturing of these electronic devices involves the physical assembly of the device chassis to the device housing. Many prior art devices rely on mechanical fasteners such as screws or clips, to retain the chassis to the housing. These fastening techniques have a number of disadvantages. For example, the assembly of a prior art device may require special tools, such as screwdrivers or the like, and may require considerable time and effort for assembly. Thus, with many prior art assembly techniques, substantial amounts of resources are consumed during the manufacture of these devices. Occasionally, these devices must be disassembled to facilitate analysis and repairs. Consequently, a similar arduous process is needed for removing the chassis from the housing in order to gain access to the internal components of the device. Therefore, there are many problems associated with assembly and disassembly of prior art electronic devices.

There is a constant demand for improving manufacturing cycle time and reducing manufacturing costs in order to remain competitive in the electronics industry. Prior art electronic device design requiring mechanical fasteners for assembly incur manufacturing costs, including component costs, piece part handling costs, inventory costs, and the like. Moreover, valuable manufacturing cycle time is consumed when these prior art assembling techniques are used. Therefore, there exists a need to provide a new electronic device assembly with designed features which facilitate assembly and disassembly.

DETAILED DESCRIPTION OF THE PREFERRED EMBODIMENT

Generally, the present invention provides a radio assembly which can be quickly assembled and disassembled. The radio includes a chassis assembly and housing in a snap-in assembly. The chassis assembly includes at least one cantilever arm having an engaging portion which engages a catch on the radio housing when the chassis assembly is slidably inserted into the housing. A release access channel situated proximate to the catch provides access for a radio disassembly tool to disengage the cantilever arm from the catch for removal of the chassis assembly. To disassemble, the disassembly tool, which includes an extraction arm with a ramped end, is slidably inserted into the release access channel and engages the cantilever arm to deflect the cantilever arm away from the catch thereby facilitating removal of the chassis from the housing.

Figure 1:
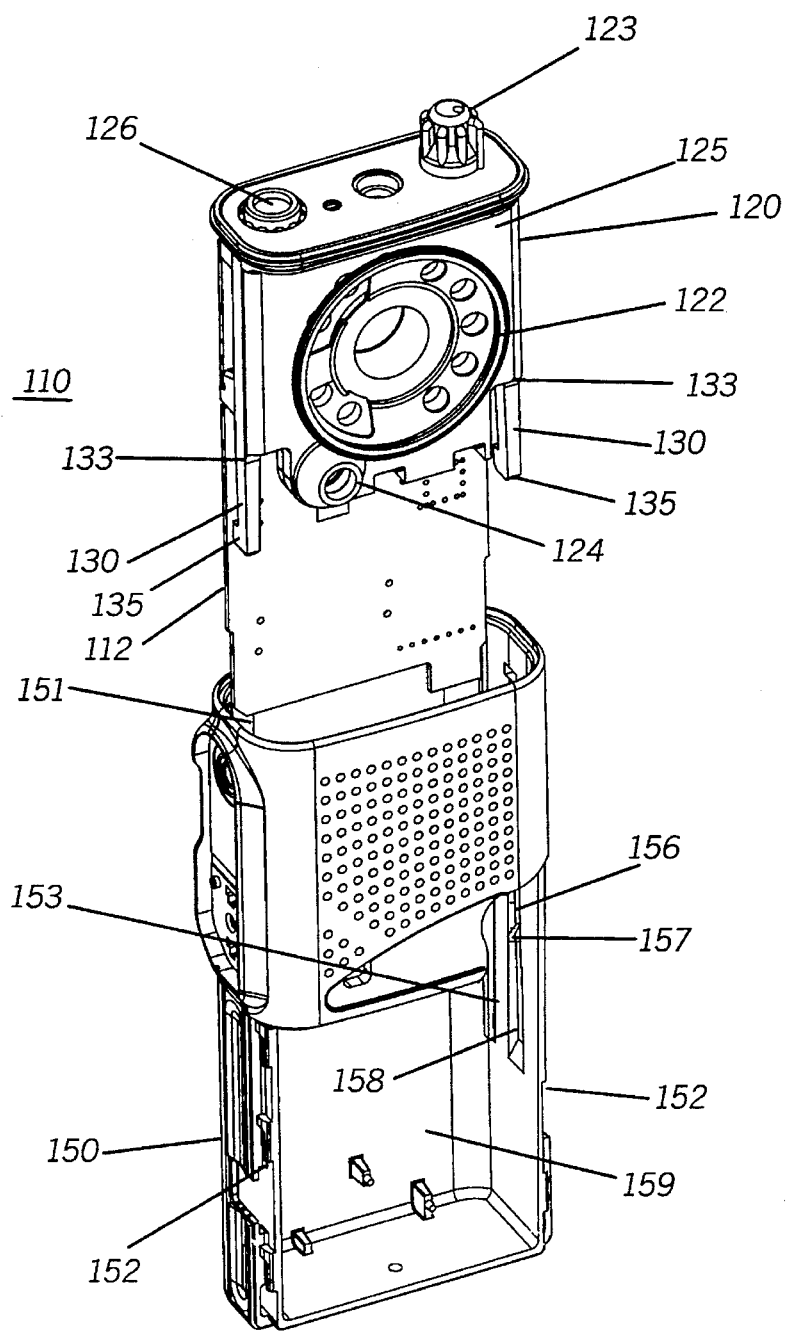
FIG. 1 is an exploded and partially broken away view in perspective of a two-way radio assembly constructed in accordance with the present invention.

The present invention can be best understood with references to FIGs. 1–5. FIG. 1 is an exploded and partially broken away view in perspective of a two-way radio assembly 100, in accordance with the present invention. The radio includes a chassis assembly 110 and a radio housing 150. The chassis assembly 110 comprises a frame portion or chassis 120, a printed circuit board 112, and electrical and mechanical components which substantially implement the function of the radio 100. The printed circuit board 112 houses some electrical components, including communication circuitry for communicating over a radio frequency channel. A portion of the chassis 120 forms a radio control top 125 which supports radio control and interface elements, including a speaker 122, a microphone 124, a control knob 123, an antenna port 126, and other similar components. The chassis 120 forms a mount frame for the printed circuit board 112 and the radio control and interface elements. The printed circuit board 112 is longitudinally mounted to the chassis portion 120 of the control top 125 and is electrically coupled to the control top 125. The speaker 122 and microphone 124 are mounted directly onto the chassis 120. Other components are mechanically coupled to the chassis 120 by various means.

The chassis 120 further includes two elongated cantilever arms 130 extending substantially parallel to the longitudinal orientation of the printed circuit board 112. Each cantilever arm 130 has two opposing ends, one end 133 being affixed to the chassis 120 and the other end 135 being a free end. The free end 135 is shaped in the form of a hook, and functions as an engaging portion or retainer hook 135. The cantilever arms 130 are formed from a plastic material, and are resilient in that they may deflect along their free end 135 while remaining affixed to the chassis 120. In the preferred embodiment, the cantilever arms 130 are deflectable toward and away from each other. Preferably, the cantilever arms 130 are integrally formed on the chassis 120, such as by injection molding.

The radio housing 150 is formed from a plastic material, such as polycarbonate, and is formed into two separate compartments, a main housing compartment 151, and a battery compartment 159. The main housing compartment 151 is substantially enclosed while the battery compartment 159 has an open face which is preferably protected by a removable cover (not shown). At least two sidewalls 152 extend longitudinally along the housing 150 along both compartments. Mounting features are designed into the radio housing 150 to facilitate the assembly of the chassis assembly 110 to the housing 150. Particularly, the radio housing 150 includes guide or mount rails 153 situated on the sidewalls 152. The guide rail 153 is for positioning and mounting the chassis assembly 110, including the control top 125 and chassis 120. The guide rail 153 positions by engaging the edges of the printed circuit board 112 as the chassis assembly 110 is inserted into the radio housing 150. The radio housing 150 has two opposing retainer mount channels 156 (only one shown) for receiving the elongated cantilever arms 130. Each mount channel 156 extends from the main housing compartment 151 to the battery compartment 159. The portion of the mount channel 156 within the battery compartment 159 forms the release access channel 158, the function of which will be described in greater detail below. A ramped retainer catch 157 portion is included in each mount channel 156 and comprises a ramp formed within the mount channel 156 and shaped to engage the retainer hook portion 135 of the cantilever arm 130.

Figure 2:
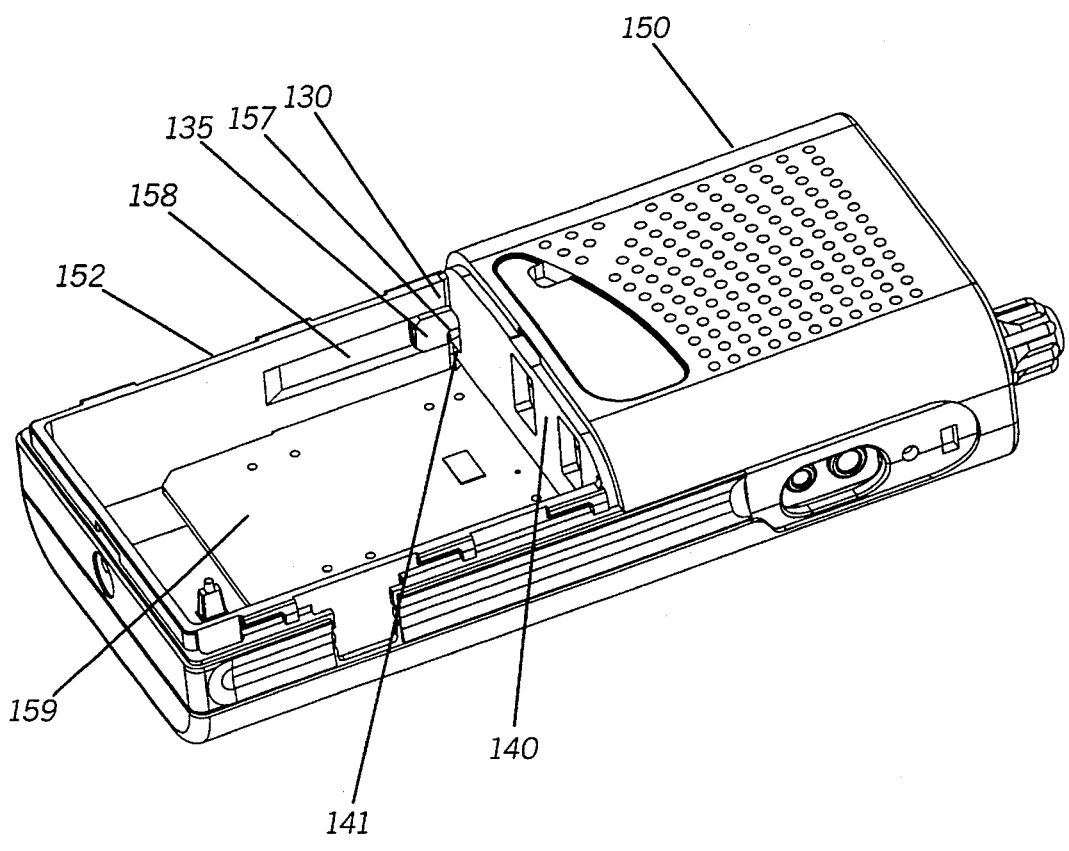
FIG. 2 is a perspective view of the assembled radio of FIG. 1.

Referring to FIG. 2, the radio assembly 100 is shown with the chassis assembly 110, including control top 125, fully assembled to the radio housing 150. From this angle, a walled portion separating the battery compartment 159 and the main housing compartment 151 can be seen. Note also that the release channel extends from the battery compartment 159 toward the main housing compartment 151 and terminates at or proximate to the retainer catch 157. When the radio is fully assembled, each cantilever arm 130 (only one shown) is positioned within a corresponding mount channel 156 such that the retainer hook portion 135 of the cantilever arm 130 is biasedly engaged with the retainer catch 157 and the sidewall 152 to secure the chassis assembly 110 within the radio housing 150. The separating wall portion 140 includes a slot 141 adjacent to the ramped catch portion 157 to provide ingress and egress for the retainer hook 135 of the cantilever arm 130 as it traverses the ramped catch portion 157. The retainer hook 135 is deflectable so as to disengage from the ramped catch portion 157 when a deflecting force is applied to the retainer hook 135. The retainer hook 135 is releasable when a tool having a ramped portion is slidably inserted within the release access channel 158 and slidably moved to engage and deflect the retainer hook 135. Thus, the retainer hook 135 is accessible from the battery compartment 159 such that the retainer hook 135 can be deflected and disengaged from the retainer catch 157.

Figure 3:
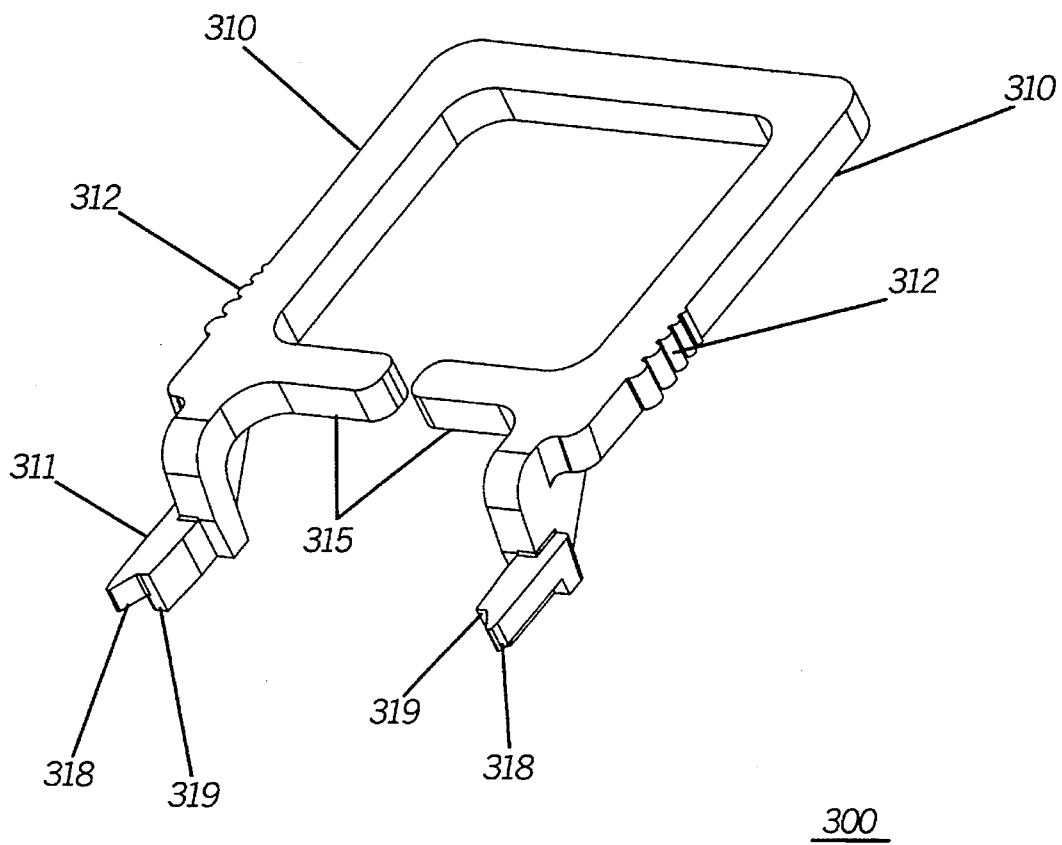
FIG. 3 is a perspective view of a radio disassembly tool, in accordance with the present invention.

Referring to FIG. 3, perspective view of a radio disassembly tool 300 is shown, in accordance with the present invention. In the preferred embodiment, the radio disassembly tool 300 is formed from a plastic material, such by injection molding. The radio disassembly tool 300 has two extraction arms 310 corresponding to the two release access channels 158 of the radio assembly 100. The extraction arms 310 have ramped ends 318 for deflecting the retainer hook portion 135 of the engaging cantilever arms 130, and a tab 319 associated with each ramped end 318 to facilitate the exertion of a pushing force. Both extraction arms 310 are mechanically coupled such that the extraction arms 310 may pivot toward and away from each other. Additionally, the disassembly tool 300 includes ribbed portions 312 for gripping, and pivot stops 315 to help prevent damage which could be caused by over pivoting.

Figure 4:
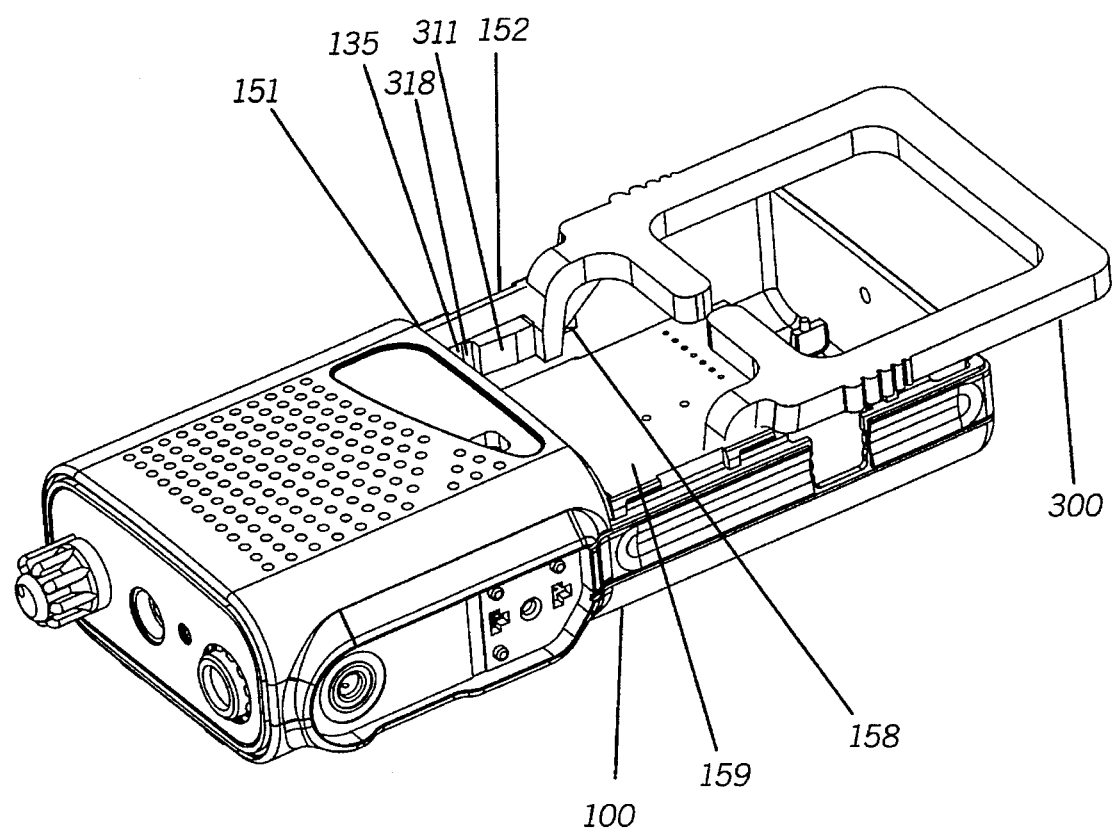
FIG. 4 is a perspective view of a combination of the radio of FIG. 1 and the radio disassembly tool of FIG. 4, in accordance with the present invention.
Figure 5:
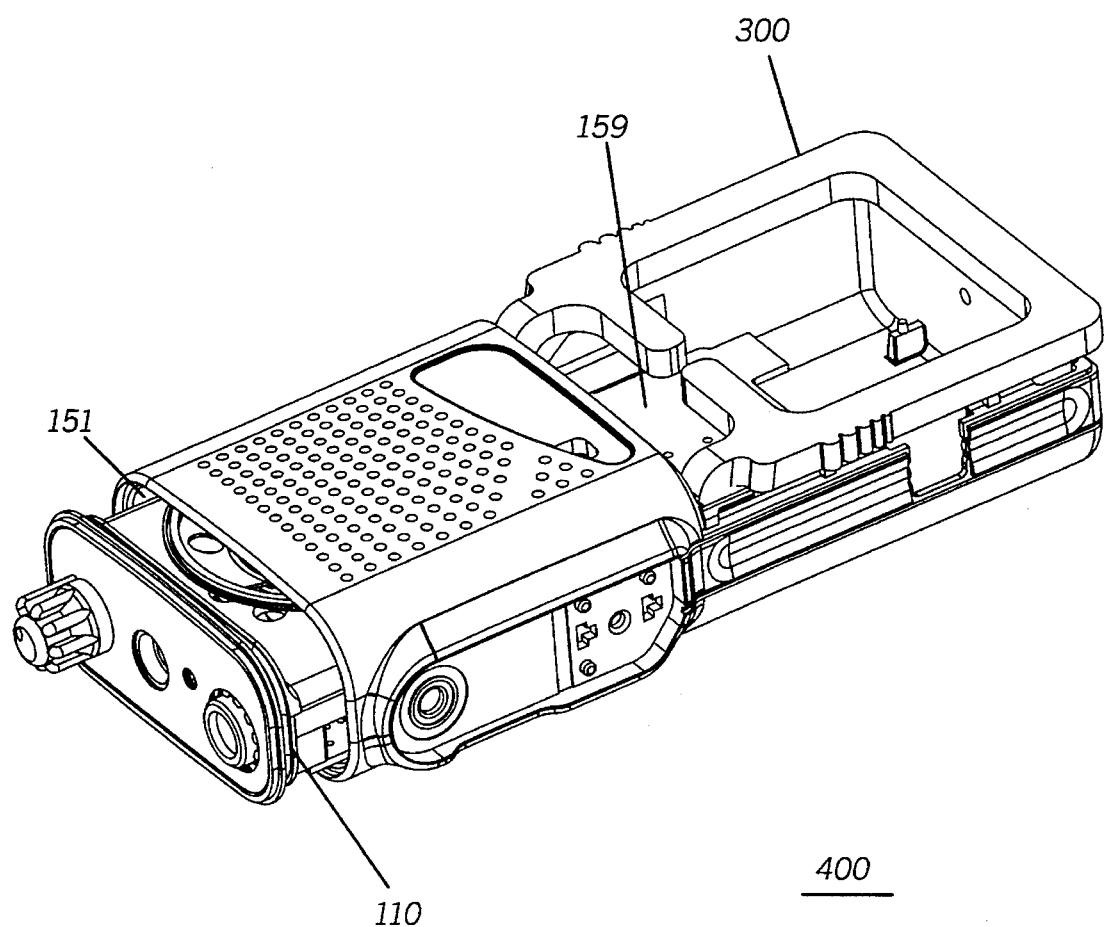
FIG. 5 is a perspective view of the radio and radio disassembly tool combination of FIG. 4, wherein the radio assembly is partially disassembled.

Referring to FIG. 4, a radio assembly and radio disassembly tool combination 400 is shown, in accordance with the present invention. The radio disassembly tool 300 is shown engaging the radio housing 150 such that a portion 311 of each extraction arm is slidably inserted in the respective release access channels 158. Thus, the extraction arms 310 are slidably seated within the release access channels 158 with each ramped end 318 positioned proximate to the retainer hook portion 135 of an engaging cantilever arm 130. When the disassembly tool is so positioned, the ramp ends may be positioned to engage the retainer hook portions 135, thereby deflecting the cantilever arms 130, and disengaging the chassis assembly 110 from the radio housing 150. To insert the disassembly tool 300 within the release access channels 158, the disassembly tool 300 is firmly grasped by the fibbed portions 312 and firmly squeeze such that the extraction arms 310 are pivoted toward each other. The disassembly tool 300 is then inserted into the battery compartment 159 on the radio housing 150 such that the ramped end portions 318 of the extraction arms 310 are positioned adjacent to the release access channels 158. The disassembly tool 300 is then released such that a portion 311 of each extraction arm 310 is securely seated within each release access channel 158. The disassembly tool 300 is then pushed toward the main housing compartment 151 such that the retainer hook portion 135 of each engaging cantilever arm 130 is biased away from the corresponding retainer catch 157 and sidewall 152 thereby releasing the chassis assembly 110 from the radio housing 150. The disassembly tool 300 is then used to push the chassis assembly 110 out from the radio housing 150. The radio and radio disassembly tool combination 400, with the radio assembly 100 partially disassembled is shown in FIG. 5.

According to the present invention, a radio assembly 100 is provided which facilitates assembly and disassembly. The radio assembly 100 includes positioning features and retaining features, including snap-in cantilever arms 130, which allow for simple assembly of the chassis assembly 110 to the radio 100. Moreover, the present invention provides a disassembly tool 300 for rapid disassembly of the chassis assembly 110 from the radio housing 150. An electronic device incorporating the concepts embodied by the present invention can offer substantial manufacturing cost advantages, in addition to maintenance costs savings.

What is claimed is:

1. A radio assembly, comprising:

a radio chassis including a resilient cantilever arm having an engaging portion; and a radio housing the radio housing having a mount channel to position the cantilever arm, the radio housing including a ramped catch portion within the mount channel to engage the engaging portion of the cantilever arm and to secure the radio chassis within the radio housing;

the chassis being mounted to the radio housing such that the engaging portion of the cantilever arm is positioned within the mount channel and is biasedly engaged with the ramped catch portion, the engaging portion being deflectable so as to disengage from the ramped catch portion when a deflecting force is applied to the engaging portion.

2. The radio assembly of claim 1, wherein:

the radio housing has a guide rail to position and mount the radio chassis within the radio housing.

3. The radio assembly of claim 1, wherein:

the radio housing has a battery compartment; and the mounting channel extends within the battery compartment to form a release access channel to facilitate deflection of the cantilever arm.

4. The radio assembly of claim 3, wherein:

the radio housing has two opposing mount channels, wherein each mount channel extends within the battery compartment to form two respective release access channels.

5. The radio assembly of claim 3, wherein:

the engaging portion is releasable when a tool having a ramped portion is slidably inserted within the release access channel and slidably moved to engage and deflect the engaging portion.

6. A radio assembly, comprising:

a radio chassis including a resilient cantilever arm having a retainer hook; and a radio housing having a guide rail to position and mount the radio chassis within the radio housing, the radio housing having a retainer mount channel to position the cantilever arm, the radio housing including a retainer catch within the retainer mount channel to engage the retainer hook of the cantilever arm and to secure the radio chassis within the radio housing;

the chassis being mounted to the radio housing such that the retainer hook of the cantilever arm is positioned within the retainer mount channel and is engaged with the retainer catch, the retainer hook being deflectable so as to disengage from the retainer catch when a deflecting force is applied to the retainer hook.

7. The radio assembly of claim 6, wherein:

the retainer catch comprises a ramp formed within the retainer mount channel.

8. The radio assembly of claim 6, further comprising:

a printed circuit board; and radio control elements;

wherein the chassis forms a mount frame for the printed circuit board and the radio control elements.

9. The radio assembly of claim 6, wherein:

the radio housing includes a main housing compartment and a battery compartment separated by a wall portion;

the retainer mount channel extends from the main housing compartment to the battery compartment; and the retainer hook is accessible from the battery compartment such as the retainer hook can be deflected and disengaged from the retainer catch.

10. A radio assembly, comprising:

a chassis assembly, comprising:

a control top including a frame portion, the frame portion having electrical components mounted thereon, the frame portion including a resilient cantilever arm having a free end shaped to form a retainer hook; and a printed circuit board mounted to the frame portion and electrically coupled to the control top; and a radio housing having a guide rail to position and mount the chassis assembly within the radio housing, the radio housing having a mount channel to position the cantilever arm, the radio housing including a retainer catch comprising a ramp portion within the retainer mount channel to engage the retainer hook of the cantilever arm and to secure the chassis assembly within the radio housing;

the chassis assembly being mounted to the radio housing such that the retainer hook of the cantilever arm is positioned within the retainer mount channel and is engaged with the retainer catch, the retainer hook being deflectable so as to disengage from the retainer catch when a deflecting force is applied to the retainer hook.

11. The radio assembly of claim 10, wherein:

the radio housing includes a main housing compartment and a battery compartment separated by a wall portion;

the retainer mount channel extends from the main housing compartment to the battery compartment; and the retainer hook is accessible from the battery compartment such as the retainer hook can be deflected and disengaged from the retainer catch.

12. A radio assembly and radio disassembly tool combination, comprising:

a radio, comprising:

a radio housing and radio chassis, the radio chassis including two resilient engaging cantilever arms which engage the radio housing to secure the radio chassis to the radio housing, the radio housing having a release access channel for each cantilever arm, the release access channel providing access to the engaging cantilever arm for disengaging the radio chassis from the radio housing; and a radio disassembly tool comprising two extraction arms, a portion of each extraction arm being formed to slidably fit into one of the release access channels, each extraction arm having a ramped end for deflecting one of the engaging cantilever arms;

wherein the extraction arms are slidably seated within the release access channel with each ramped end positioned proximate to an engaging cantilever arm such that the ramped ends may engage the engaging cantilever arms to disengage the radio chassis from the radio housing.

13. The radio assembly and radio disassembly tool combination of claim 12, wherein both extraction arms are mechanically coupled such that the extraction arms may pivot toward and away from each other.

14. The radio assembly and radio disassembly tool combination of claim 12, wherein the radio disassembly tool is formed from a plastic material.

15. The radio assembly and radio disassembly tool combination of claim 12, wherein:

the radio housing includes a main housing compartment and a battery compartment; and the release access channel extends from the battery compartment toward the main housing compartment.

16. A radio disassembly tool for disassembling a radio assembly, the radio assembly including a radio housing and radio chassis, the radio chassis including two resilient engaging cantilever arms which engage the radio housing to secure the radio chassis to the radio housing, the radio housing having a release access channel for each cantilever arm, the release access channel providing access to the engaging cantilever arm for disengaging the radio chassis from the radio housing, the radio disassembly tool comprising:

two extraction arms, a portion of each extraction arm being formed to slidably fit into one of the release access channels, each extraction arm having a ramped end for deflecting one of the engaging cantilever arms;

wherein the extraction arms can be slidably positioned within the release access channel with each ramped end positioned proximate to an engaging cantilever arm such that the ramped ends may engage the engaging cantilever arms to disengage the radio chassis from the radio housing.

17. The radio disassembly tool of claim 16, wherein both extraction arms are mechanically coupled such that the extraction arms may pivot toward and away from each other.

18. The radio disassembly tool of claim 16, wherein the radio disassembly tool is formed from a plastic material.

* * * * *